Dec. 30, 1958  J. E. M. TAYLOR  2,866,610
AIRCRAFT JET THRUST CONTROL
Filed April 10, 1956  2 Sheets-Sheet 1
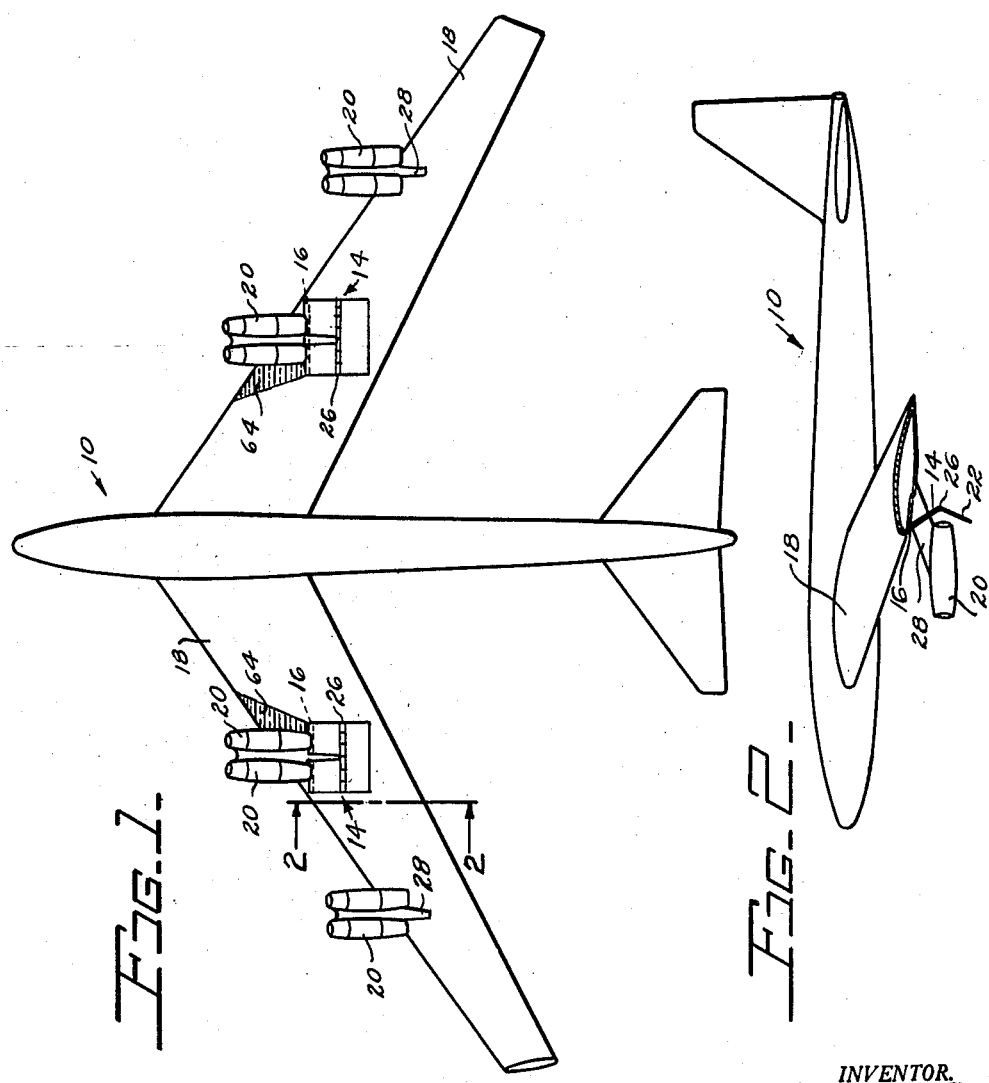
INVENTOR.
JOHN E. M. TAYLOR
BY
ATTORNEYS Dec. 30, 1958 J. E. M. TAYLOR 2,866,610
AIRCRAFT JET THRUST CONTROL
Filed April 10, 1956 2 Sheets-Sheet 2
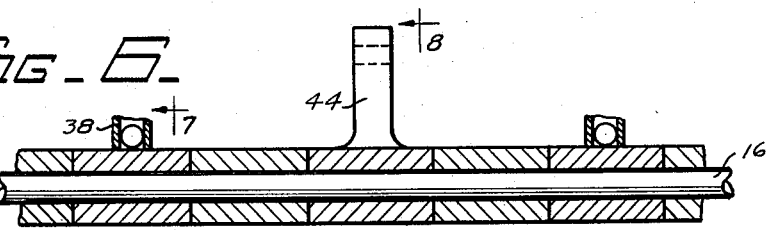
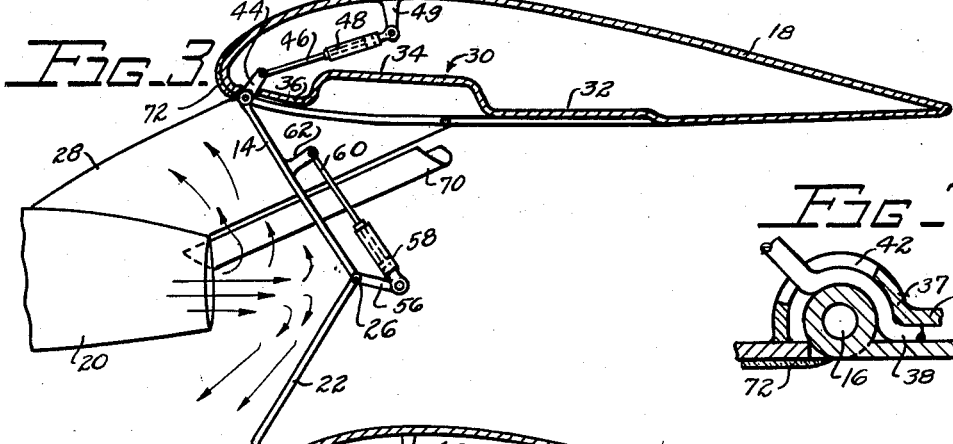
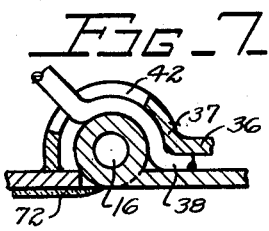
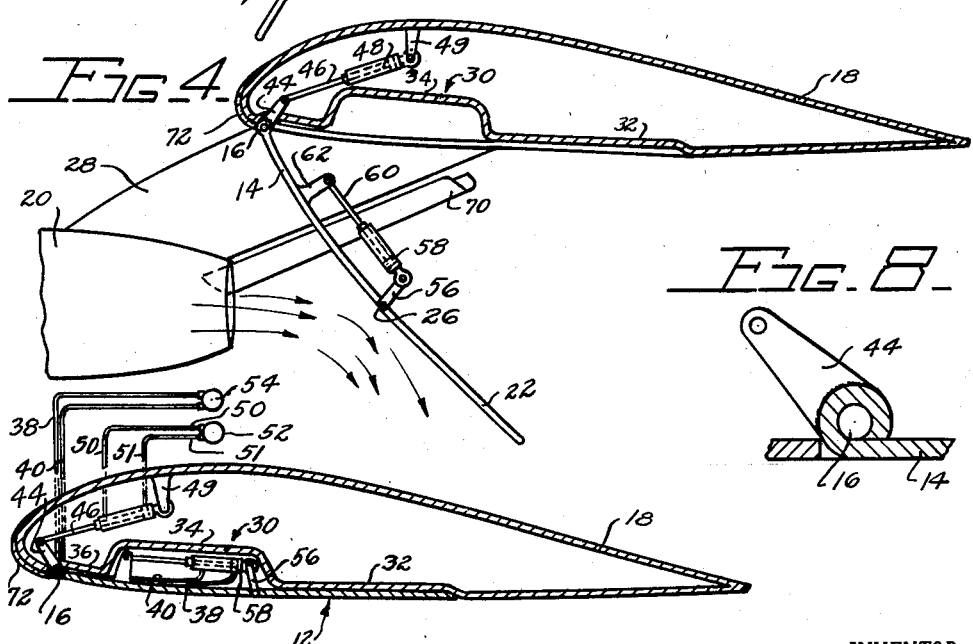
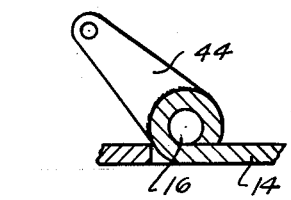
INVENTOR.
JOHN E. M. TAYLOR
BY
ATTORNEYS

United States Patent Office 2,866,610
Patented Dec. 30, 1958

2,866,610

AIRCRAFT JET THRUST CONTROL

John E. M. Taylor, Cleveland, Ohio

Application April 10, 1956, Serial No. 577,424

2 Claims. (Cl. 244—52)

(Granted under Title 35, U. S. Code (1952), sec. 266)

The invention described herein may be manufactured and used by or for the United States Government for governmental purposes without payment to me of any royalty thereon.

The present invention relates to aircraft thrust control and more particularly to a member interposed into the jet stream exteriorly of a jet engine pod to provide controlled lift and reverse thrust. As is well known in the art of jet propulsion, there are three main areas of difficulty in landing high speed jet powered aircraft. First, the rate of descent in landing is poor because the landing must be accomplished at a high speed. Second, in turbojet aircraft, time is required to regain full power from the idle power setting during landing, thus making for a very dangerous condition if an emergency go-around should be necessary. Third, when cross winds are high or under conditions where the runways are wet or icy or when brakes fail, the aircraft cannot be brought to a stop on any reasonable runway lane. This condition is particularly true in such aircraft as the B-52 and B-49 where the bomb load cannot be jettisoned or where it might be necessary to land on a short civil airways field.

The object of the present invention is the provision of a device to improve safety, and reduce operating costs on jet powered airplanes by providing the pilot much greater control of jet thrust than is now afforded particularly during descent, landing and during the ground roll.

A further object of the present invention is the provision of a thrust control means which operates directly in the path of the emitted jet, is outside of the engine pod, and can be operated to at least two positions, one in which the conversion of a very substantial proportion of the forward thrust into reverse thrust is accomplished; the other of which provides reverse thrust and a proportion of lift. Further, the device can be operated to positions intermediate these two.

A further object of the invention is the provision of a thrust control member which operates exteriorly of the jet engine and forms an integral part of the body of the airplane, such as a portion of wing surface, the complete mechanism for its operation being contained within the wing, and the thrust control member itself forming an uninterrupted part of the wing surface when the thrust control element is folded into inoperative position.

A further object of the invention is to provide a brake or thrust control element for a jet aircraft which element lies completely outside and aft of the engine pod.

A further object of the invention is the provision of a thrust control member which in flight forms an uninterrupted portion of the wing surface and which can be lowered to a position to the rear of the engine so that the jet is intercepted and its thrust redirected.

A further object of the invention is the provision of a thrust control member which is lowered aft of a jet engine at selected angles and intercepts the flow, redirecting it to provide reverse thrust, lift, reverse thrust with a lift component, reverse thrust with a descent component, or selected variations of these conditions.

A further object of the invention is the provision of thrust control means, the operating mechanism of which is such as to produce an insignificant minimum of additional drag.

Other objects and advantages will become apparent as the description proceeds.

Referring to the drawings, Fig. 1 is an underside view of a jet aircraft such as a B-52 wherein the thrust control element has been added to four of the jet engines.

Fig. 2 is a fragmentary schematic side elevational view of a turbojet aircraft showing the wing in cross section taken substantially on the line 2—2 of Fig. 1.

Fig. 3 is a schematic cross sectional view of the wing of the airplane taken substantially on the line 2—2 of Fig. 1, showing the thrust control element lowered to jet intercepting position and presenting an angular surface to the emitted jet.

Fig. 4 is a schematic view similar to Fig. 3 showing the thrust control element in a second jet intercepting position.

Fig. 5 is a schematic cross section of the wing showing the thrust control element in its closed position, and showing the operating mechanism.

Fig. 6 is a longitudinal vertical cross section of the main hinge between the thrust control element and the wing.

Fig. 7 is a vertical cross section substantially on the line 7—7 of Fig. 6.

Fig. 8 is a vertical cross section taken substantially on the line 8—8 of Fig. 6.

Referring more in detail to the drawings, an aircraft (10) such as the B-52 or B-49 is shown by way of examples in Figs. 1 and 2. The thrust control or jet deflector member indicated generally by the numeral 12 is comprised of three sections. A pair of plate sections 14 forming the inner portion of the deflector are hinged at 16 to the under portion of the wing 18 at a point above and slightly aft of the tail pipe or exhaust cone of the jet engine pod 20. The combined width of members 14 is equal to or greater than the combined width of the installed twin turbo jets and is of such length that their outer edges lie in the plane of the horizontal median of the pods, when the sections 14 are lowered at an angle of the order of 45 degrees to the horizontal.

A plate section 22 or outer portion of the thrust control element 12 is hinged by means of a hinge 26 along the outer or rear edges of the elements 14. The inner portion of the thrust control element is thus divided into two sections 14 with a space between them to accommodate the strut 28 which strut secures the engine pods 20 to the wing 18.

When the thrust control element is in the retracted or folded position as shown in Fig. 5, the surface of the element forms a continuous and uninterrupted part of the skin surface of the wing 18. The contour of the wing is formed on its under surface with an inwardly extending recess or housing 30 for accommodating operating means later described. This housing is composed of areas 32, 34, 36 and 37. Area 32 is of such depth only as to allow the thrust control member 12 to lie within it and form an uninterrupted and continuous part of the wing skin. The area 34 is greater in depth and is of such depth as to accommodate a portion of the operating mechanism of the jet deflector element, which will later be described.

The third section 36 extends substantially horizontally forward to the hinge 16, and curves over at 37. The section 36 is spaced a distance from the thrust control element in its folded position, thus providing space for the fluid pressure conduits or ducts 38 and 40 which lead to fluid pressure motors. The portion 37 of the housing 30 extends over the hinge 16, as shown best in Figure 7, and is provided with an opening 42 which allows the fluid pressure ducts 38 and 40 to pass through to the interior of the wing.

An actuating arm or lever 44 is pivotally connected at one end into the hinge 16, is fixed to the plate 14 and is pivotally connected at its outer end to a piston rod 46. The piston rod 46 is actuated by a piston within the piston cylinder 48, constituting a fluid pressure motor. The piston cylinder 48 is pivotally supported from the upper interior surface of the wing by a bracket 49. The fluid pressure conduits 50 and 51 lead to the piston cylinder 48, from the operating control means 52 located in the cockpit and within reach of the pilot, as shown schematically in Fig. 5. The specific fluid pressure motors shown are hydraulic cylinders but may be operated from any fluid pressure source, including the established pressure system installed for operation of ailerons. Electrical means may be substituted.

The device just described is operable by a pilot from his position in the cockpit to open the thrust control element to the position shown in Fig. 4. In this position the elements 14 and the member 22 are in substantial alignment and are lowered to a position of about 45° to the horizontal axis of the engine pods 20, i. e., to a position where they intercept the jet at an angle of approximately 45°. In this position, most of the jet is directed angularly downward, resulting in both reverse thrust and lift.

A second fluid pressure control operating means 54 is positioned within reach of the pilot in the cockpit for operating the thrust control mechanism from the position of substantial alignment shown in Fig. 4 to the position shown in Fig. 3. In this latter position, the members 14 and member 22 form an angle of the order of 90° or slightly over. The jet striking the vortex of this angle bisects it. The jet strikes members 14 and 22 at an angle of approximately 45°, the lift force of the jets striking member 14 being counteracted by the descent thrust of the jets striking the elements 22. Both jet streams are given a reverse component, the main portion of the jet stream being redirected both up and down through approximately 135°. This angular relationship is alterable as desired, and is controllable by the pilot.

The thrust control element is operated to this position by the following means: An arm or lever 56 is rigidly secured into the hinge portion of the deflecting surface 26 to pivot with it. The opposite end of the arm 56 is pivotally secured to the end of a piston cylinder 58. A piston rod 60 operated by a piston within the cylinder 58 is pivotally secured to an arm or lever 62 which has rigid attachment to the hinged end of the member 22. The fluid pressure conduits 38 and 40 previously mentioned connect the operating control means 54 to the opposite ends of the piston cylinder 58. They pass into the interior of the wing, through the hinge 16 and through the space provided by the area 36 to the piston cylinder 58 as has been previously described.

By varying the angular relation between the members 14 and 22 in Fig. 3 position, varying degrees of reverse thrust, and lift thrust may be obtained. Also by varying the angle of the thrust control element in the Fig. 4 position with respect to the vertical, varying degrees of reverse thrust and lift may be obtained.

It should be noted that, should an emergency "go around" be required, the position of the control element can be changed quickly from either of its jet intercepting positions to fully retracted position into the underside of the wing.

Due to the high temperatures which are encountered, the thrust control element must of necessity be made from highly heat resistant materials. Various portions of the aircraft are protected, as experimentation has indicated the necessity, by the use of heat resisting skin material such as stainless steel Inconel, etc. One such portion is shown at 64.

The flap 70 is positioned along the rearward edge of the strut 28 for the purpose of protecting the structure from the intense heat and also may serve the purpose of directing the jet in some degree. The lead area of the wing is protected by a highly heat resistant protective shield 72. Other portions of the aircraft structure are protected in this manner as found necessary and desirable.

I claim:

1. In a thrust control brake device for jet aircraft, a deflector member located outside and aft of the aircraft engine and mounted independently thereof, said deflector member comprising an inner plate member and an outer plate member, the inner plate member being hinged to the wing of said aircraft, the outer plate member being hinged to the outer edge of said inner member, operating means for lowering said deflecting member to intercept the jet stream issuing from said engines, means for varying the angular relationship of said inner and outer plate members between a straight angle and an angle of the order of 90°, thus varying the angle of impact of said jet stream against said plates to effect variations in the proportion of reverse thrust and lift.

2. A brake device for aircraft jet engines wherein said jet engines are arranged in pairs supported by a single strut, comprising a deflector member secured to the wing of said aircraft above and aft of the exhaust cone of said engine, said deflector being capable of assuming an inoperative position, and in that position forming a continuous uninterrupted part of the skin surface of said wing, said deflector member comprising an inner section and an outer section forming together a rectangle, the inner section of said deflector being divided and forming the inner half of said rectangle, said inner divided section being hinged along its inner edge to said wing, the divided portions of said inner sections being spaced apart to accommodate said strut, the outer section forming the outer half of said rectangle and hinged continuously along its inner edge to the outer edges of the divided portions of the inner section, operating means contained within the wing interior for lowering said deflector into the path of the jet stream issuing from said engines, means for varying the position and angular relationship of the inner and outer sections from straight angular relationship to an angle of the order of 90°, and achieving a condition wherein the jet striking the vortex of the angle bisects the angle, affording both reverse thrust and lift.

References Cited in the file of this patent

UNITED STATES PATENTS 2,734,698    Straayer    Feb. 14, 1956